United States Patent
Mignoli et al.

(10) Patent No.: US 10,542,593 B1
(45) Date of Patent: Jan. 21, 2020

(54) POWER OFFLOADING FOR LINEAR CURRENT SOURCE

(71) Applicant: Infineon Technologies AG, Neubiberg (DE)

(72) Inventors: Franco Mignoli, Verona (IT); Marco Pamato, Schio (IT); Maurizio Galvano, Padua (IT); Hans-Peter Kreuter, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/252,296

(22) Filed: Jan. 18, 2019

(51) Int. Cl.
H05B 33/08 (2006.01)

(52) U.S. Cl.
CPC ..... *H05B 33/0812* (2013.01); *H05B 33/0845* (2013.01); *H05B 33/0887* (2013.01)

(58) Field of Classification Search
CPC ............ H05B 33/0812; H05B 33/0815; H05B 33/0827; H05B 33/083; H05B 33/0848; H05B 33/0887
See application file for complete search history.

(56) References Cited

U.S. PATENT DOCUMENTS

| | | | |
|---|---|---|---|
| 8,400,081 B2 | 3/2013 | Catalano et al. | |
| 8,963,431 B2 | 2/2015 | van den Berg et al. | |
| 9,468,051 B1 * | 10/2016 | Lin | H05B 33/0815 |
| 9,781,788 B1 * | 10/2017 | Cortigiani | H02M 1/08 |
| 2007/0188425 A1 | 8/2007 | Saccomanno | |
| 2007/0257645 A1 * | 11/2007 | Nishino | H02M 1/32 323/276 |
| 2010/0207543 A1 * | 8/2010 | Crawford | H05B 33/0815 315/294 |
| 2010/0315019 A1 * | 12/2010 | Hoogzaad | G01K 7/01 315/291 |
| 2011/0199003 A1 | 8/2011 | Muguruma et al. | |

(Continued)

FOREIGN PATENT DOCUMENTS

WO 2012063141 A1 5/2012

OTHER PUBLICATIONS

"Infineon® LITIX™ Basic Driver Family, Multichannel Solutions for N-1, Open Load & Short Circuit Detection," Infineon, Application Note, Automotive Power, V1.1, Mar. 27, 2015, 65 pp.

(Continued)

*Primary Examiner* — Renan Luque
(74) *Attorney, Agent, or Firm* — Schumaker & Sieffert, P.A.

(57) ABSTRACT

A controller circuit for a set of light emitting diodes (LEDs) includes a linear current source, channel circuitry, and supervisor circuitry. The linear current source is configured to regulate a first current from a supply along a first series path to the set of LEDs. The channel circuitry is configured to control a second current from the supply along a second series path to the set of LEDs, the second series path being in parallel with the first series path and the second series path comprising a drop element coupled in series with the supply and the set of LEDs. The supervisor circuitry is configured to regulate a total current supplied to the set of LEDs using the linear current source and the channel circuitry, the total current comprising the first current and the second current.

12 Claims, 14 Drawing Sheets

(56) References Cited

U.S. PATENT DOCUMENTS

| | | | |
|---|---|---|---|
| 2013/0088174 A1* | 4/2013 | Yagi | H05B 33/0896 315/307 |
| 2013/0127353 A1 | 5/2013 | Athalye et al. | |
| 2013/0257279 A1* | 10/2013 | Le | H05B 33/0812 315/113 |
| 2014/0241387 A1* | 8/2014 | Ortiz | H01S 3/0912 372/38.02 |
| 2015/0022112 A1* | 1/2015 | Nietfeld | H05B 33/0827 315/210 |
| 2015/0245433 A1* | 8/2015 | McCune, Jr. | H05B 33/0851 315/294 |

OTHER PUBLICATIONS

U.S. Appl. No. 15/690,793, by Fabrizio Cortigiani, filed Aug. 30, 2017.

* cited by examiner

US 10,542,593 B1

POWER OFFLOADING FOR LINEAR CURRENT SOURCE

TECHNICAL FIELD

This disclosure relates a linear current source, and more specifically, a multichannel linear current source.

BACKGROUND

Driver circuits may be used to control the amount of power provided to loads from power sources. In operation, a driver circuit may dissipate an amount of power that is proportional to the voltage across the driver circuit and the current flowing through the driver circuit. In some examples, such power dissipation may cause a driver circuit to overheat, which may negatively impact the functionality of the driver circuit. As such, in some examples, it may be desirable to reduce the amount of power dissipated by driver circuits.

SUMMARY

In general, this disclosure is directed to reducing an amount of power dissipated at a linear current source. For example, channel circuitry in parallel with a linear current source may dissipate power at a drop element (e.g., a resistor), which results in a corresponding reduction in power dissipated at the linear current source. In this way, a linear current source may be selected to accommodate a lower power dissipation and/or for less waste heat compared to a linear current source that is not in parallel with channel circuitry configured to dissipate power at a drop element, which may reduce a cost and/or improve a reliability of a resulting circuit.

In one example, a controller circuit for a set of light emitting diodes (LEDs) includes: a linear current source configured to regulate a first current from a supply along a first series path to the set of LEDs; channel circuitry configured to control a second current from the supply along a second series path to the set of LEDs, the second series path being in parallel with the first series path and the second series path comprising a drop element coupled in series with the supply and the set of LEDs; and supervisor circuitry configured to regulate a total current supplied to the set of LEDs using the linear current source and the channel circuitry, the total current comprising the first current and the second current.

In another example, a method for controlling a set of LEDs includes: regulating, by a controller circuit, a first current from a supply along a first series path to the set of LEDs; controlling, by the controller circuit, a second current from the supply along a second series path to the set of LEDs, the second series path being in parallel with the first series path and the second series path comprising a drop element coupled in series with the supply and the set of LEDs; and regulating, by the controller circuit, a total current supplied to the set of LEDs using the regulation of the first current and the controlling of the second current, the total current comprising the first current and the second current.

In another example, a system includes: a supply; a drop element; a set of LEDs; and a controller circuit for the set of LEDs comprising: a linear current source configured to regulate a first current from the supply along a first series path to the set of LEDs; channel circuitry configured to control a second current from the supply along a second series path to the set of LEDs, the second series path being in parallel with the first series path and the second series path comprising the drop element coupled in series with the supply and the set of LEDs; and supervisor circuitry configured to regulate a total current supplied to the set of LEDs using the linear current source and the channel circuitry, the total current comprising the first current and the second current.

Details of these and other examples are set forth in the accompanying drawings and the description below. Other features, objects, and advantages will be apparent from the description and drawings, and from the claims.

DETAILED DESCRIPTION

In some systems, in order to reduce an amount of power dissipated at a linear current source, a linear voltage regulator regulates a voltage supplied to the linear current source.

However, as the linear voltage regulator and linear current source may be arranged in a same integrated circuit (IC), the IC is, nonetheless, specified to dissipate all the waste heat from both the linear voltage regulator and linear current source. Some systems may instead regulate voltage to the linear current source using a switched-mode power supply (e.g., direct current (DC) to DC power converter), which may significantly add to a cost of a resulting circuit.

Some systems use a component external to an IC implementing a linear current source by arranging a resistor in parallel to a power element of the linear current source. However, such systems apply specialized control systems to regulate current at the linear current source, which significantly adds to a complexity and/or cost of a resulting circuit.

Rather than relying on voltage regulation or a resistor in parallel to a power element of the linear current source, examples described herein may use channel circuitry in parallel with the linear current source. The channel circuitry may dissipate power at a drop element (e.g., a resistor) that is external to an IC implementing the linear current source to reduce power dissipated at the linear current source (and by the IC) without using specialized control systems to regulate current at the linear current source. In this way, a linear current source may be selected to accommodate a lower power dissipation and/or for less waste heat compared to a linear current source that is not in parallel with channel circuitry, which may reduce a cost and/or improve a reliability of a resulting circuit compared to systems that do not use channel circuitry.

Figure 1:
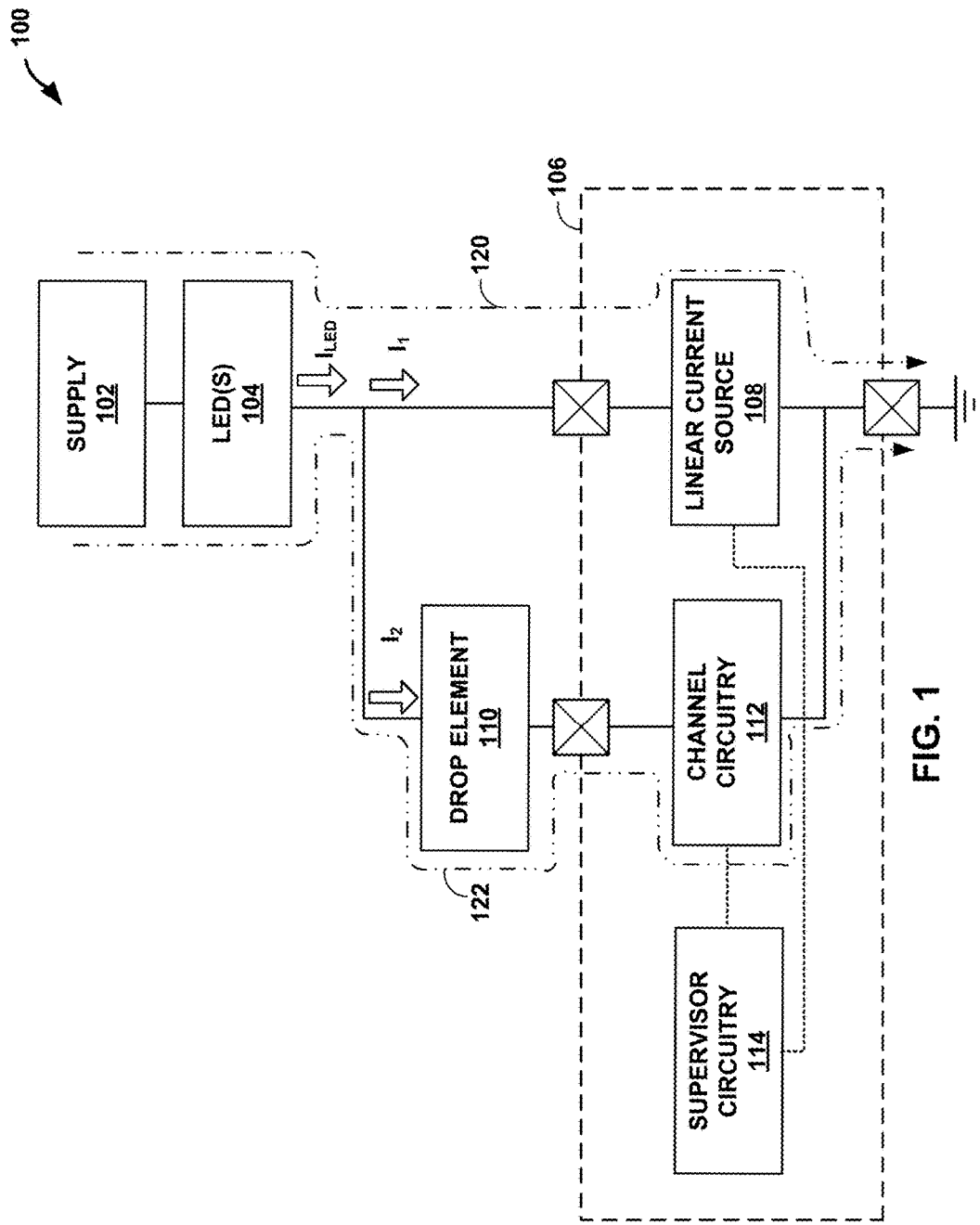
FIG. 1 is a block diagram illustrating an example system configured to reduce an amount of power dissipated at a linear current source, in accordance with one or more techniques of this disclosure.

FIG. 1 is a block diagram illustrating an example system 100 configured to reduce an amount of power dissipated at linear current source 108, in accordance with one or more techniques of this disclosure. As illustrated in the example of FIG. 1, system 100 may include supply 102, a set of LEDs 104 (hereinafter "LEDs"), IC 106, and drop element 110. IC 106 includes linear current source 108, channel circuitry 112, and supervisor circuitry 114.

Supply 102 may be configured to provide electrical power to one or more other components of system 100. For instance, supply 102 may be configured to supply power to LEDs 104. In some examples, supply 102 includes a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, supply 102 may include an output of a linear voltage regulator, a power converter, or a power inverter. For instance, supply 102 may include an output of a DC to DC power converter, an alternating current (AC) to DC power converter, and the like. In some examples, supply 102 may represent a connection to an electrical supply grid. In some examples, the input power signal provided by supply 102 may be a DC input power signal. For instance, in some examples, supply 102 may be configured to provide a DC input power signal in the range of ~5 $V_{DC}$ to ~40 $V_{DC}$.

LEDs 104 may refer to any suitable semiconductor light source. In some examples, LEDs 104 include a p-n junction configured to emit light when activated. In an exemplary application, LEDs 104 be included in a headlight assembly for automotive applications. For instance, LEDs 104 may be a matrix of light emitting diodes to light a road ahead of a vehicle. As used herein, a vehicle may refer to trucks, boats, golf carts, snowmobiles, heavy machines, or any type of vehicle that uses directional lighting.

Linear current source 108 may be configured to regulate current. For example, linear current source 108 may receive power from supply 102 (e.g., a battery) at a varying voltage, dissipate a portion of power received from supply 102, and regulate a current through linear current source 108 to a constant current. Linear current source 108 may be configurable to regulate a current through linear current source 108 to an adjustable constant current (indicated by supervisor circuitry 114).

Drop element 110 may be configured to dissipate power. Drop element 110 may include a resistor. Channel circuitry 112 may include a current sensor configured to measure current at channel circuitry 112 (e.g., through drop element 210). In some examples, drop element 110 may include a diode or switching element.

Examples of switching elements may include, but are not limited to, a silicon-controlled rectifier (SCR), a Field Effect Transistor (FET), and a bipolar junction transistor (BJT). Examples of FETs may include, but are not limited to, a junction field-effect transistor (JFET), a metal-oxide-semiconductor FET (MOSFET), a dual-gate MOSFET, an insulated-gate bipolar transistor (IGBT), any other type of FET, or any combination of the same. Examples of MOSFETS may include, but are not limited to, a depletion mode p-channel MOSFET (PMOS), an enhancement mode PMOS, depletion mode n-channel MOSFET (NMOS), an enhancement mode NMOS, a double-diffused MOSFET (DMOS), any other type of MOSFET, or any combination of the same. Examples of BJTs may include, but are not limited to, PNP, NPN, heterojunction, or any other type of BJT, or any combination of the same. It should be understood that switching elements may be high-side or low-side switching elements. Additionally, switching elements may be voltage-controlled and/or current-controlled. Examples of current-controlled switching elements may include, but are not limited to, gallium nitride (GaN) MOSFETs, BJTs, or other current-controlled elements.

Channel circuitry 112 may be configured to control current. Channel circuitry 112 may include one or more switching elements. For example, channel circuitry 112 may operate in an open state or a closed state, where during the open state channel circuitry 112 sets a current to correspond to zero and where during the closed state channel circuitry refrains from setting the current to correspond to zero.

Channel circuitry 112 may be configured to regulate current. For example, channel circuitry 112 may receive power from supply 102 (e.g., a battery), via drop element 110, at a varying voltage, dissipate a portion of power received from supply 102, and regulate a current through channel circuitry 112 to a constant current. In some examples, channel circuitry 112 may include a linear current source.

Supervisor circuitry 114 may be configured to regulate a total current supplied to LEDs 104 using linear current source 108 and channel circuitry 112. For example, supervisor circuitry 114 may generate one or more control signals based on a voltage at across linear current source 108 to drive linear current source 108 and/or control channel circuitry 112. Supervisor circuitry 114 may be a microcontroller on a single integrated circuit containing a processor core, memory, inputs, and outputs. For example, supervisor circuitry 114 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Supervisor circuitry 114 may be a combination of one or more analog components and one or more digital components.

In accordance with one or more techniques described, supervisor circuitry 114 drives linear current source 108 to regulate a first current ("$I_1$") from supply 102 along a first series path 120 to LEDs 104. Supervisor circuitry 114 controls a second current ("$I_2$") from supply 102 along second series path 122 to LEDs 104. As shown, second series path 122 is in parallel with first series path 120 and second series path 122 includes drop element 110 coupled in series with supply 102 and LEDs 104. Supervisor circuitry 114 regulates a total current ("$I_{LED}$") supplied to LEDs 104 using the regulation of the first current ("$I_1$") and the controlling of the second current ("$I_2$"), the total current comprising the first current and the second current.

Figure 6:
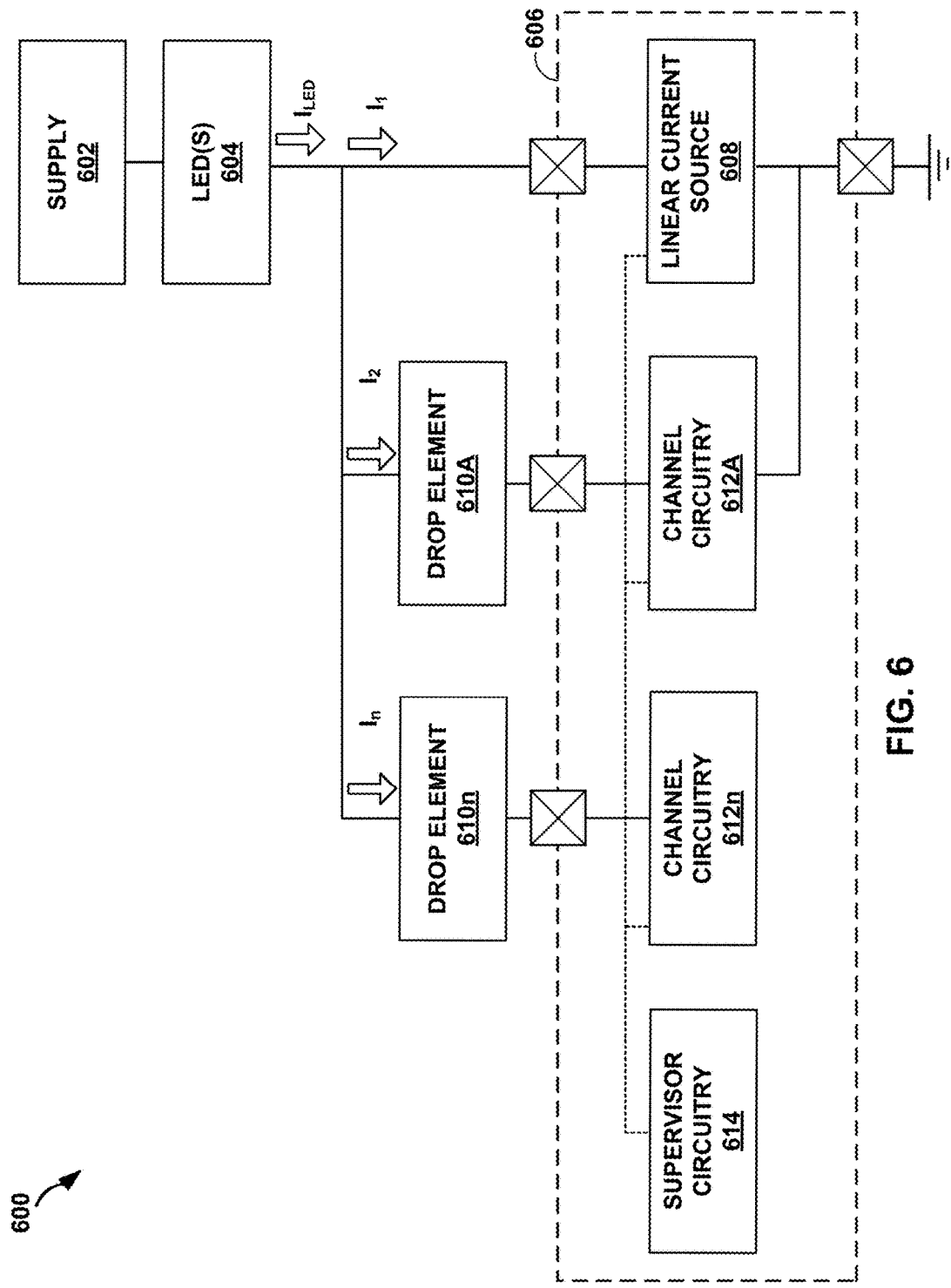
FIG. 6 is a block diagram illustrating a first example of the system of FIG. 1, in accordance with one or more techniques of this disclosure.

Although system 100 of FIG. 1 illustrates only one channel circuitry instance (e.g., channel circuitry 112) some examples may include more than one channel circuitry instance (see FIG. 6). Moreover, although system 100 of FIG. 1 illustrates IC 106 being arranged on a low side of supply 102, some examples may arrange IC 106 on a high side of supply 102 (see FIG. 7). For example, first series path 120 may include a positive terminal of supply 102 directly coupled to a first node of LEDs 104, a second node of LEDs 104 may be directly coupled to a first node of linear current source 108, and a second node of linear current source 108 may be directly coupled to a negative terminal of supply 102. In this example, second series path 122 may include the positive terminal of supply 102 being directly coupled to the first node of LEDs 104, the second node of LEDs 104 may be directly coupled to a first node of drop element 110, a second node of drop element 110 may be directly coupled to a first node of channel circuitry 112, and a second node of channel circuitry 112 may be directly coupled to the negative terminal of supply 102.

Figure 2A:
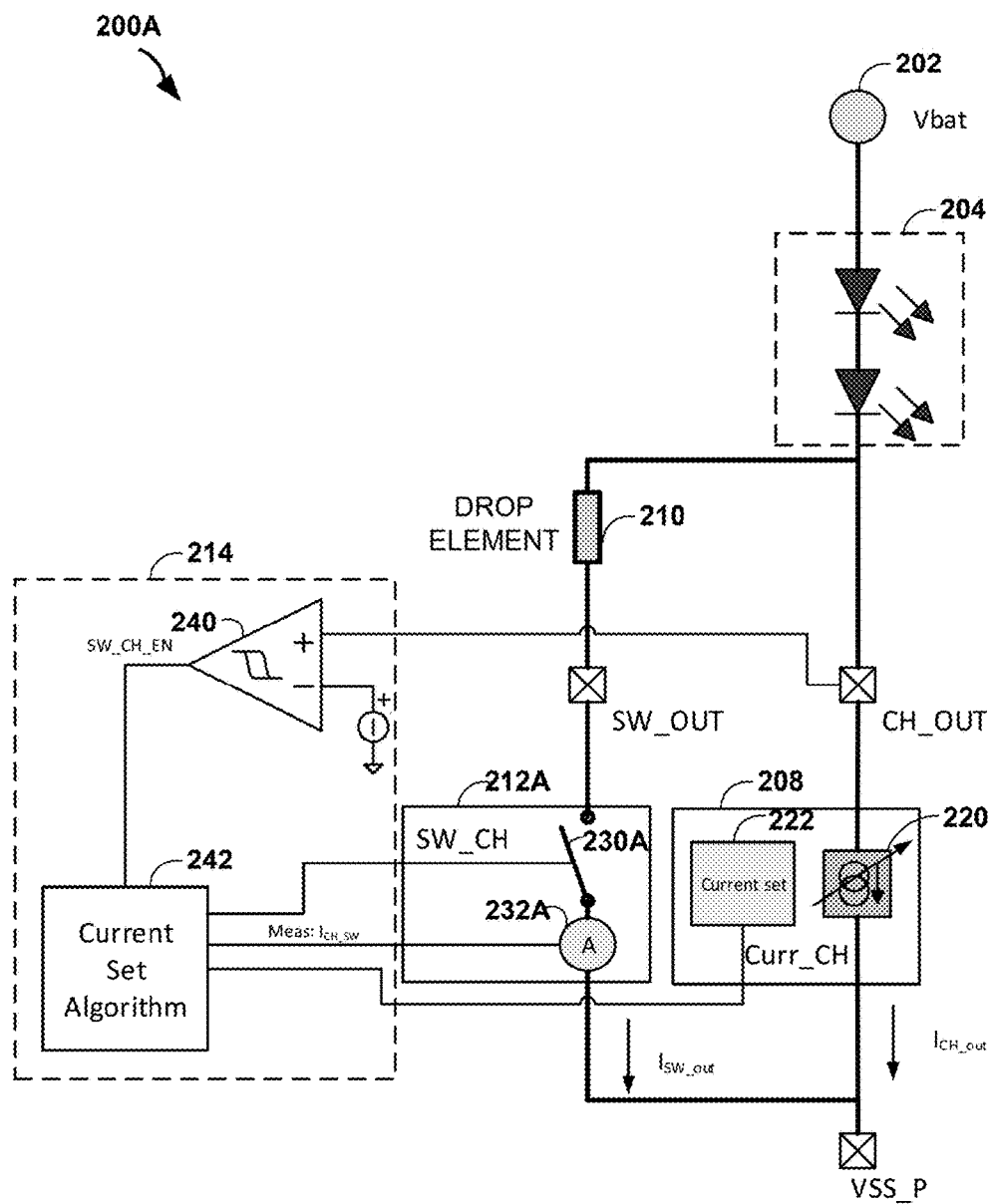
FIG. 2A is a conceptual diagram illustrating a first circuit of the system of FIG. 1, in accordance with one or more techniques of this disclosure.

FIG. 2A is a conceptual diagram illustrating a first circuit 200A of the system 100 of FIG. 1, in accordance with one or more techniques of this disclosure. As illustrated in the example of FIG. 2A, circuit 200A may include supply 202, LEDs 204, linear current source 208, drop element 210, channel circuitry 212A, and supervisor circuitry 214, which may be examples of supply 102, LEDs 104, linear current source 108, drop element 110, channel circuitry 112, and supervisor circuitry 114 of FIG. 1.

As shown, linear current source 208 includes power element 220 (e.g., a current regulator) and current set module 222. In the example of FIG. 2A, channel circuitry 212A includes switching element 230A and current sensor 232A. Supervisor circuitry 214 may include comparator 240 and current set module 242.

In the example of FIG. 2A, channel circuitry 212A comprises switching element 230A coupled in series with supply 202, drop element 210, and LEDs 204 along a second series path and configured to operate in an open state or a closed state, where during the open state switching element 230A sets the second current to correspond to zero and where during the closed state switching element 230A refrains from setting the second current to correspond to zero. In this example, channel circuitry 212A may be configured to operate switching element 230A in the open state or the closed state.

Current set module 242, with comparator 240, may maintain a constant total current on LEDs 204 for different voltages output by supply 102 (e.g., battery). That is, current set module 242 may balance current at switching element 230A and at power element 220. Specifically, current set module 242 may keep the sum of the current on switching element 230A plus the current on power element 220 constant ($I_{CH\_out}+I_{SW\_out}=I_{LED}=$Const) even when a voltage output by supply 202 is varying.

Current set module 242 may use a measured current value output by current sensor 232A at switching element 230A (current flowing $I_{Sw\_out}$) and set current set module 222 on the CH_OUT to have the desired current on LEDs 204 chain using the equation $I_{CH\_out}+I_{Sw\_out}=$LED. Current set module 242 may determine to open switching element 230A if the measured current value output by current sensor 232A at switching element 230A is too high. Supervisor circuitry 214 may be implemented analog circuitry or digital circuitry.

For example, supervisor circuitry 214 may be configured to subtract the measured second current ($I_{Sw\_out}$) from a target total current ($I_{LED}$) to generate a target first current ($I_{CH\_out}$) and drive linear current source 208 such that linear current source 208 sets the first current to correspond to the target first current. More specifically, for example, current set module 242 may be configured to subtract the measured second current output by current sensor 232A from a target total current to generate a target first current and configure current set module 222 to drive power element 220 such that power element 220 sets the first current to correspond to the target first current.

Current set module 242 may execute an algorithm, for example, the following algorithm.
IF SW_CH_EN=H
THEN
IF ICH_OUT>0
  THEN
IF CH_OUT>Vdrop
  THEN
SW_CH='Closed';
ICH_OUT=ISUM−ISW_OUT;
ELSE SW_CH='Open';
  ICH_OUT=ISUM;
where SW_CH_EN specifies whether switching element 230A is enabled ("H"), ICH_OUT specifies current through power element 220, CH_OUT specifies voltage across power element 220, SW_CH=Closed specifies operating switching element 230A in a closed state, ISUM specifies a target total current, ISW_OUT specifies current measured by current sensor 232A through switching element 230A, and SW_CH=Open specifies operating switching element 230A in an open state.

Said differently, for example, supervisor circuitry 214 may be configured to operate switching element 230A in a closed state in response to a voltage across linear current source 208 being greater than an operating zone threshold and to operate switching element 230A in the open state in response to the voltage across linear current source 208 being not greater than the operating zone threshold ("Vdrop"). For instance, supervisor circuitry 214 may be configured to operate switching element 230A in a closed state in response to an output by comparator 240 indicating a voltage across linear current source 208 is greater than an operating zone threshold and to operate switching element 230A in the open state in response to the output by comparator 240 indicating the voltage across linear current source 208 is not greater than the operating zone threshold.

Figure 2B:
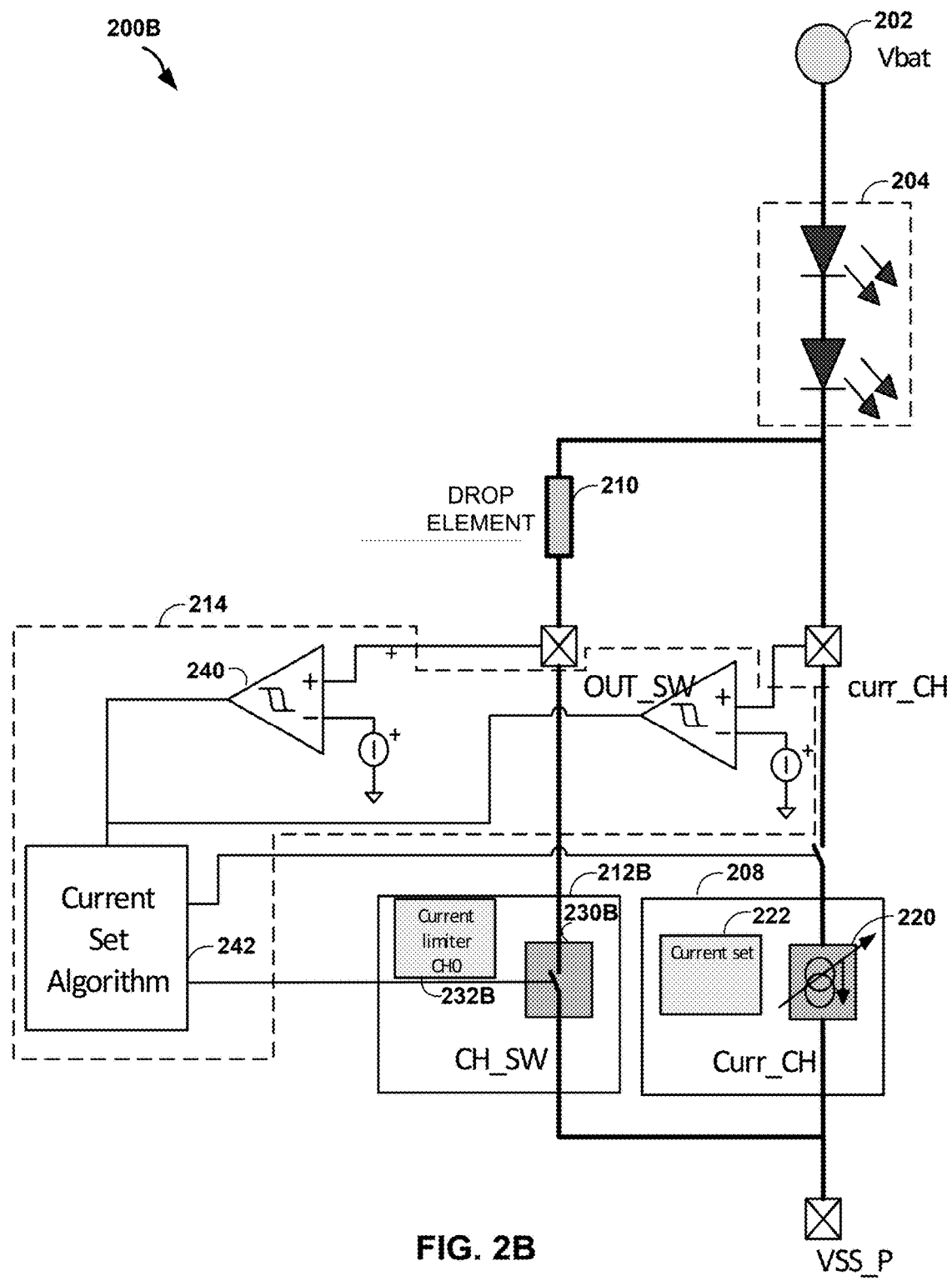
FIG. 2B is a conceptual diagram illustrating a second circuit of the system of FIG. 1, in accordance with one or more techniques of this disclosure.

FIG. 2B is a conceptual diagram illustrating a second circuit 200B of the system of FIG. 1, in accordance with one or more techniques of this disclosure. FIG. 2B is substantially similar to FIG. 2A except, the example of FIG. 2B includes channel circuitry 212B. Channel circuitry 212B includes protected switching element 230B and programmable limitation current module 232B. In the example of FIG. 2B, programmable limitation current module 232B may be programmed to limit current through channel circuitry 212B to a protection zone threshold to extend the functionality of channel circuitry 212B to a higher level of voltage output by supply 202 (e.g., a battery) as discussed further with respect to FIG. 3B.

Figure 3A:
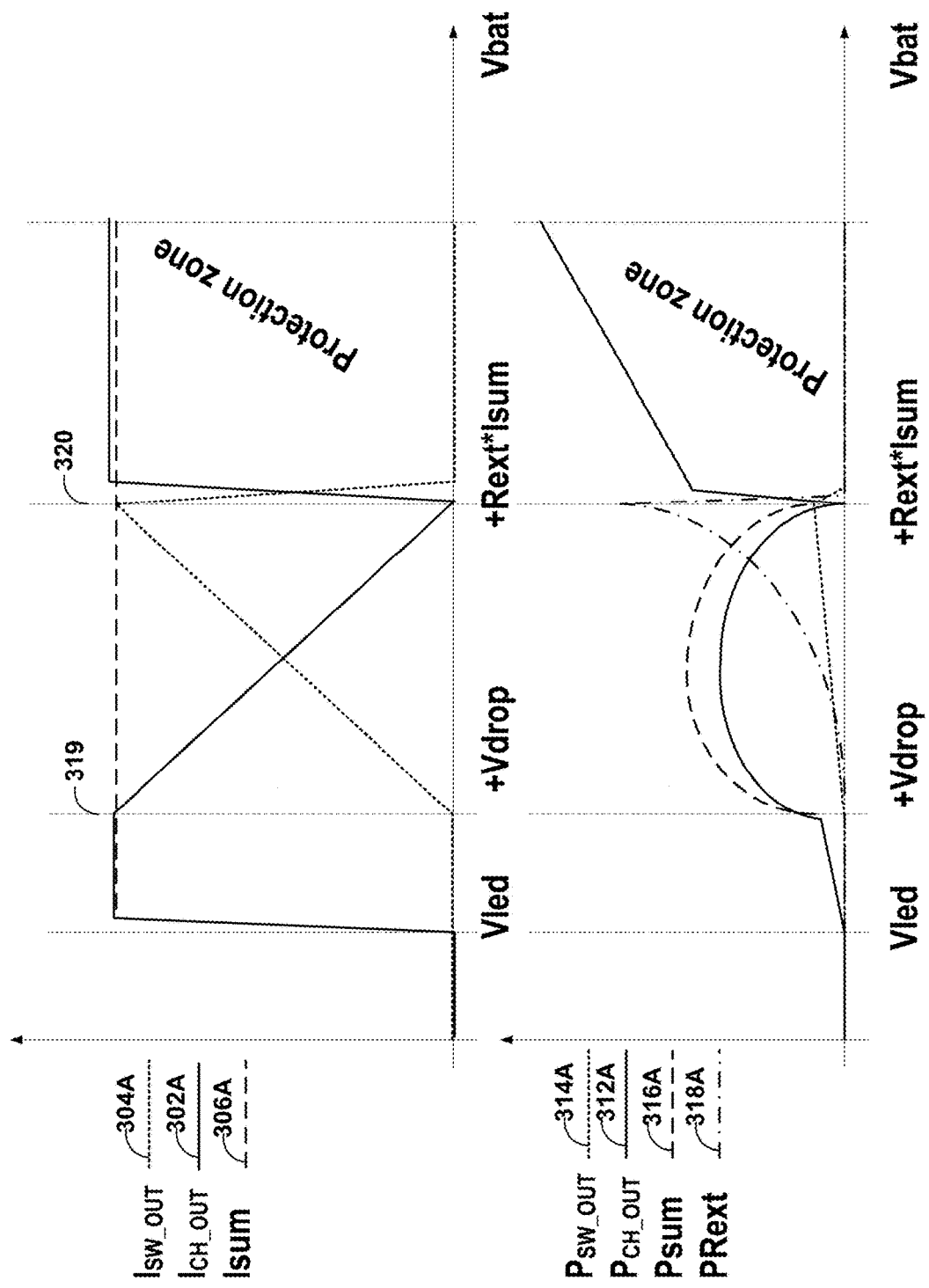
FIG. 3A is a graphical illustration of a first performance of the first circuit of FIG. 2A, in accordance with one or more techniques of this disclosure.

FIG. 3A is a graphical illustration of a first performance of the first circuit 200A of FIG. 2A, in accordance with one or more techniques of this disclosure. The abscissa axis (e.g., horizontal) of FIG. 3A represents a voltage output by supply 202 and the ordinate axis (e.g., vertical) of FIG. 3A represents a first current 302A at linear current source 208, a second current 304A at channel circuitry 212A, a total current 306A at LEDs 204, a first power 312A dissipated at linear current source 208, a second power 314A dissipated at channel circuitry 212A, a total power 316A dissipated at linear current source 208 and channel circuitry 212A, and a drop power 318A dissipated at drop element 210.

In the example of FIG. 3A, current set module 242 of supervisor circuitry 214 may be configured to operate switching element 230A in a closed state in response to a voltage across linear current source 208 being greater than an operating zone threshold 319 ("+Vdrop") and to operate switching element 230A in the open state in response to the voltage across linear current source 208 being not greater than operating zone threshold 319. As shown, operating zone threshold 319 may correspond to a turn-on voltage for LEDs 204 ("Vled") plus a voltage drop at drop element 210 ("+Vdrop").

In this example, current set module 242 of supervisor circuitry 214 is configured to operate switching element 230A in the closed state in response to the voltage across linear current source 208 being not greater than protection zone threshold 320 and to operate switching element 230A in the open state in response to the voltage across linear current source 208 being greater than protection zone threshold 320. As shown, protection zone threshold 320 may correspond to a turn-on voltage for LEDs 204 ("Vled") plus a voltage drop at drop element 210 ("+Vdrop") plus a result of a target total current ("sum") multiplied by a resistance of drop element 210 ("+Rext*Isum").

Figure 3B:
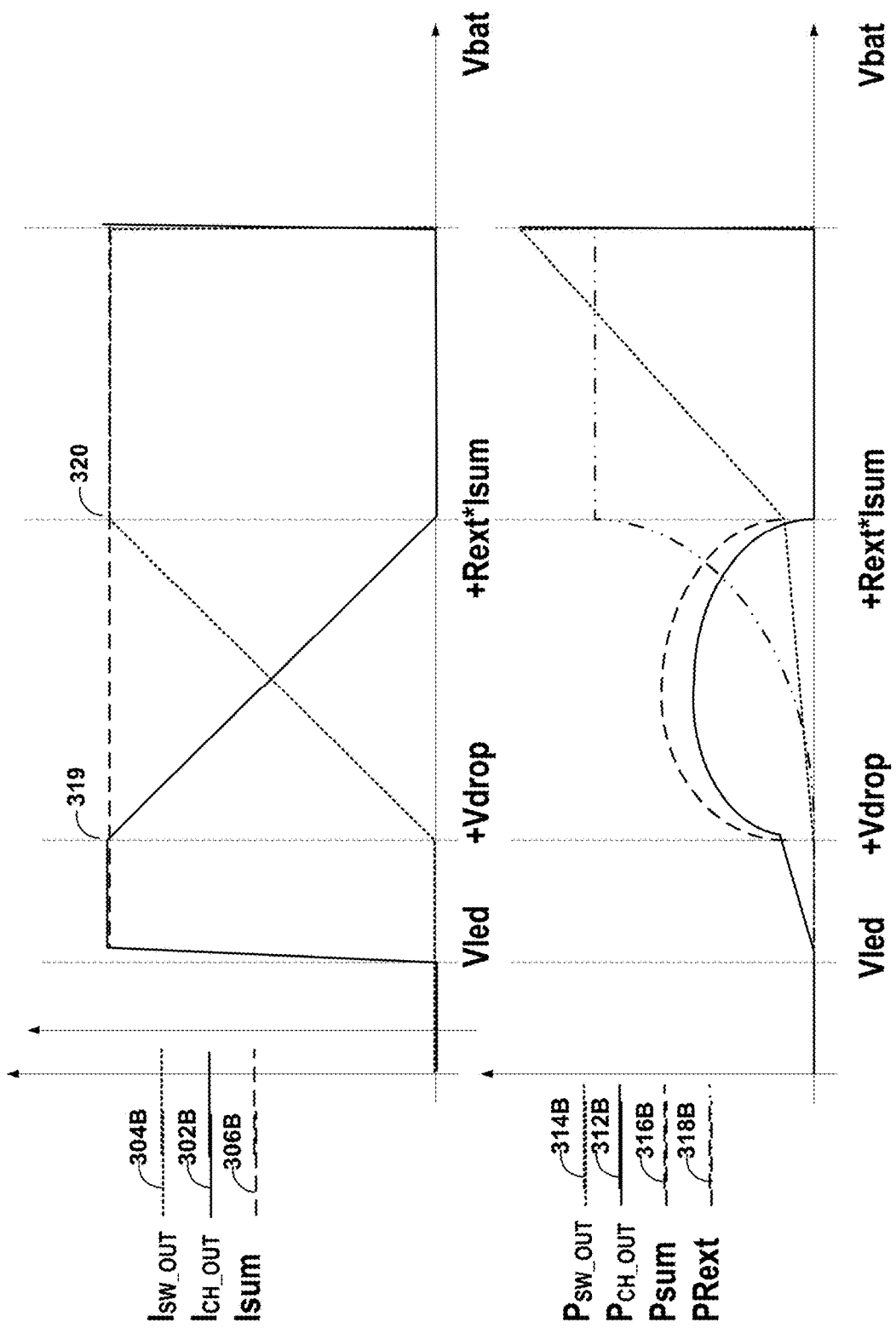
FIG. 3B is a graphical illustration of a second performance of the second circuit of FIG. 2B, in accordance with one or more techniques of this disclosure.

FIG. 3B is a graphical illustration of a second performance of second circuit 200B of FIG. 2B, in accordance with one or more techniques of this disclosure. The abscissa axis (e.g., horizontal) of FIG. 3B represents a voltage output by supply 202 and the ordinate axis (e.g., vertical) of FIG. 3B represents a first current 302B at linear current source 208, a second current 304B at channel circuitry 212B, a total current 306B at LEDs 204, a first power 312B dissipated at linear current source 208, a second power 314B dissipated at channel circuitry 212B, a total power 316B dissipated at linear current source 208 and channel circuitry 212B, and a drop power 318B dissipated at drop element 210.

Similar to FIG. 3A, in the example of FIG. 3B, (current set module 242 of) supervisor circuitry 214 may be configured to operate protected switching element 230B in a closed state in response to a voltage across linear current source 208 being greater than an operating zone threshold 319 ("+Vdrop") and to operate switching element 230B in the open state in response to the voltage across linear current source 208 being not greater than operating zone threshold 319. As shown, operating zone threshold 319 may correspond to a turn-on voltage for LEDs 204 ("Vled") plus a voltage drop at drop element 210 ("+Vdrop").

In the example of FIG. 3B, channel circuitry 212B is configured to limit current through protected switching element 230B to be not greater than target total current 306B. In this example, current set module 242 of supervisor circuitry 214 is configured to drive switching element 230B (e.g., with programmable limitation current module 232B) such that first current 302B corresponds to zero in response to the voltage across linear current source 208 being greater than protection zone threshold 320.

Figure 4:
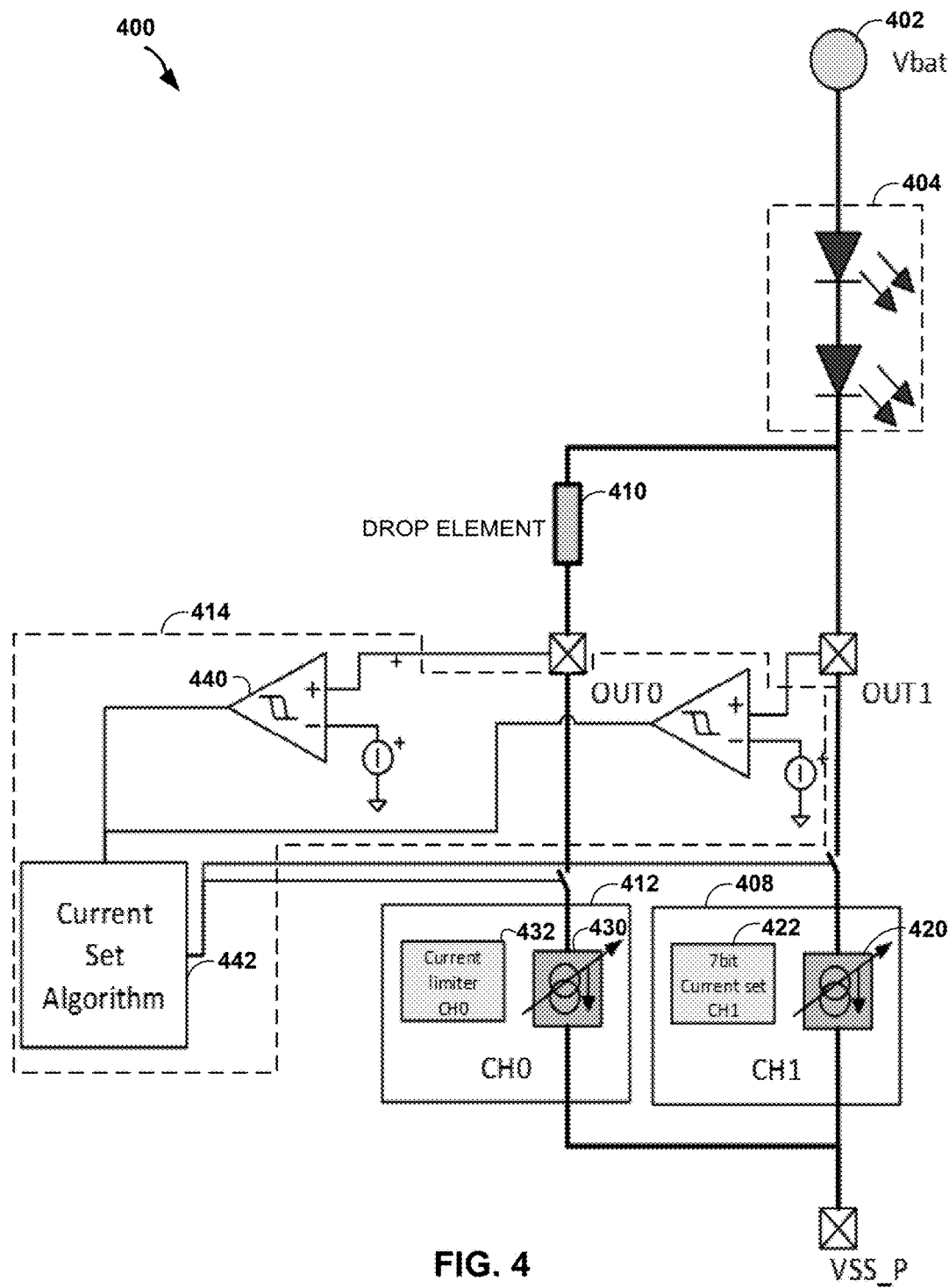
FIG. 4 is a conceptual diagram illustrating a circuit of the system of FIG. 1 with a first linear current source and a second linear current source, in accordance with one or more techniques of this disclosure.

FIG. 4 is a conceptual diagram illustrating a circuit 400 of system 100 of FIG. 1 with first linear current source 408 and second linear current source 412, in accordance with one or more techniques of this disclosure. As illustrated in the example of FIG. 4, circuit 400 may include supply 402, LEDs 404, first linear current source 408, drop element 410, second linear current source 412, and supervisor circuitry 414, which may be examples of supply 102, LEDs 104, linear current source 108, drop element 110, channel circuitry 112, and supervisor circuitry 114 of FIG. 1.

As shown, first linear current source 408 includes power element 420 (e.g., a current regulator) and current set module 422. Supervisor circuitry 214 may include comparator 240 and current set module 242. In the example of FIG. 4, second linear current source 412 includes power element 430 and current set module 432. FIG. 4 is discussed with respect to FIG. 5.

Figure 5:
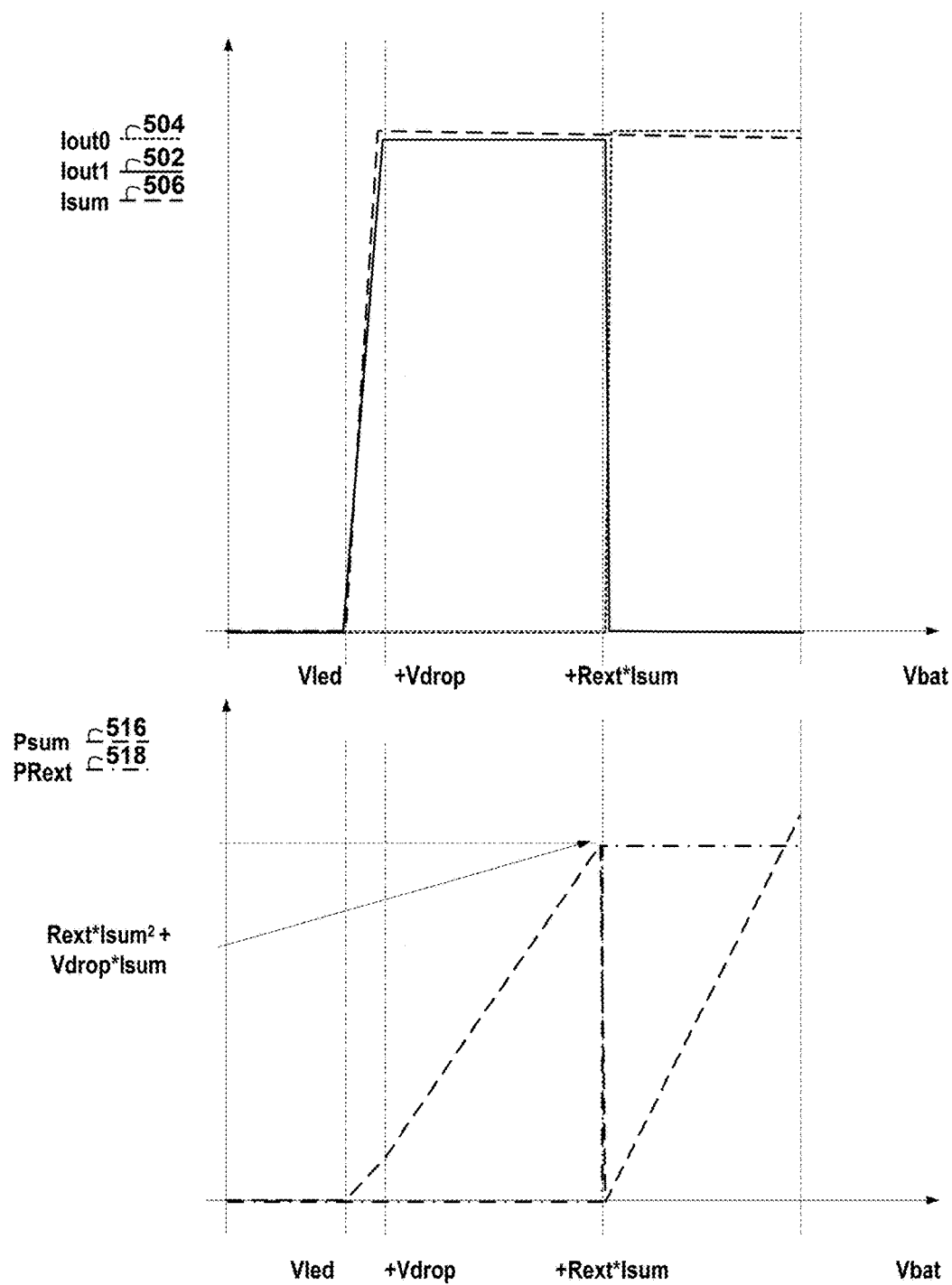
FIG. 5 is a graphical illustration of a performance of the circuit of FIG. 4, in accordance with one or more techniques of this disclosure.

FIG. 5 is a graphical illustration of a performance of the circuit 400 of FIG. 4, in accordance with one or more techniques of this disclosure. The abscissa axis (e.g., horizontal) of FIG. 5 represents a voltage output by source 402 and the ordinate axis (e.g., vertical) of FIG. 5 represents a first current 502 at first linear current source 408, a second current 504 at second linear current source 412, a total current 406 at LEDs 404, a total power 516 dissipated at first linear current source 408 and second linear current source 412, and a drop power 518 dissipated at drop element 410.

In this example, power element 430 is configured to regulate the second current according to current set module 432. Current set module 442 is configured to operate in a plurality of states comprising a first state and a second state, where, when operating in the first state, current set module 442 is configured to drive power element 420 of linear current source 408 such that first current 502 corresponds to a target total current (e.g., total current 406) and drive power element 430 of second linear current source 412 such that second current 504 corresponds to zero, and where, when operating in the second state, current set module 442 is configured to drive power element 430 of second linear current source 412 such that second current 504 corresponds to the target total current (e.g., total current 406) and drive power element 420 of first linear current source 408 such that first current 502 corresponds to zero.

Current set module 442 of supervisor circuitry 414 may be configured to determine a voltage drop using one or more of a voltage across a first linear current source 408 and a voltage across a second linear current source 412. In response to the voltage drop being not greater than an operating zone threshold, current set module 442 of supervisor circuitry 414 may be configured to operate in the first state. In response to the voltage drop being greater than the operating zone threshold, current set module 442 of supervisor circuitry 414 may be configured to operate in the second state.

FIG. 6 is a block diagram illustrating a first example of the system of FIG. 1, in accordance with one or more techniques of this disclosure. As illustrated in the example of FIG. 6, system 600 may include supply 602, LEDs 604, linear current source 608, and supervisor circuitry 614, which may be examples of supply 102, LEDs 104, linear current source 108, and supervisor circuitry 114 of FIG. 1. Additionally, system 600 may include drop element 610A and drop element 610N (collectively referred to herein as "drop elements 610"), each of which may be an example of drop element 110, and channel circuitry 612A and channel circuitry 612N (collectively referred to herein as "channel circuitry 612"), each of which may be an example of channel circuitry 112.

In some examples, one or more drop elements of drop elements 610 may have a different resistance from other drop elements of drop elements 610. For instance, drop element 610A may have a higher resistance than drop element 610N. In some examples, each one of drop elements 610 may have an equal resistance to each other drop element of drop elements 610. For instance, drop element 610A may have a resistance equal to a resistance of drop element 610N. Similarly, one or more drop elements of drop elements 610 may have a different type from other drop elements of drop elements 610. For instance, drop element 610A may include a resistor and drop element 610B may include a diode or switching element. While the example of FIG. 6 illustrates two drop elements, other examples may include more than two drop elements.

Similar to system 100 of FIG. 1, in FIG. 6, supervisor circuitry 614 drives linear current source 608 to regulate a first current ("$I_1$") from supply 602 along a first series path to LEDs 604. Supervisor circuitry 614 controls a second current ("$I_2$") from supply 602 along second series path 622 to LEDs 604. In this example, the second series path is in parallel with the first series path and the second series path includes drop element 610A coupled in series with supply 602 and LEDs 604.

The example of FIG. 6 further includes channel circuitry 612N configured to control a third current ("$I_n$") from the supply along a third series path to LEDs 604, the third series path being in parallel with the first series path and the second series path, and where the third series path comprises drop element 610N coupled in series with supply 602 and LEDs 604. Supervisor circuitry 614 regulates a total current ("$I_{LED}$") supplied to LEDs 104 using the regulation of the first current ("$I_1$"), the controlling of the second current ("$I_2$") by channel circuitry 612A, the controlling of the third current ("$I_n$") by channel circuitry 612N.

Figure 7:
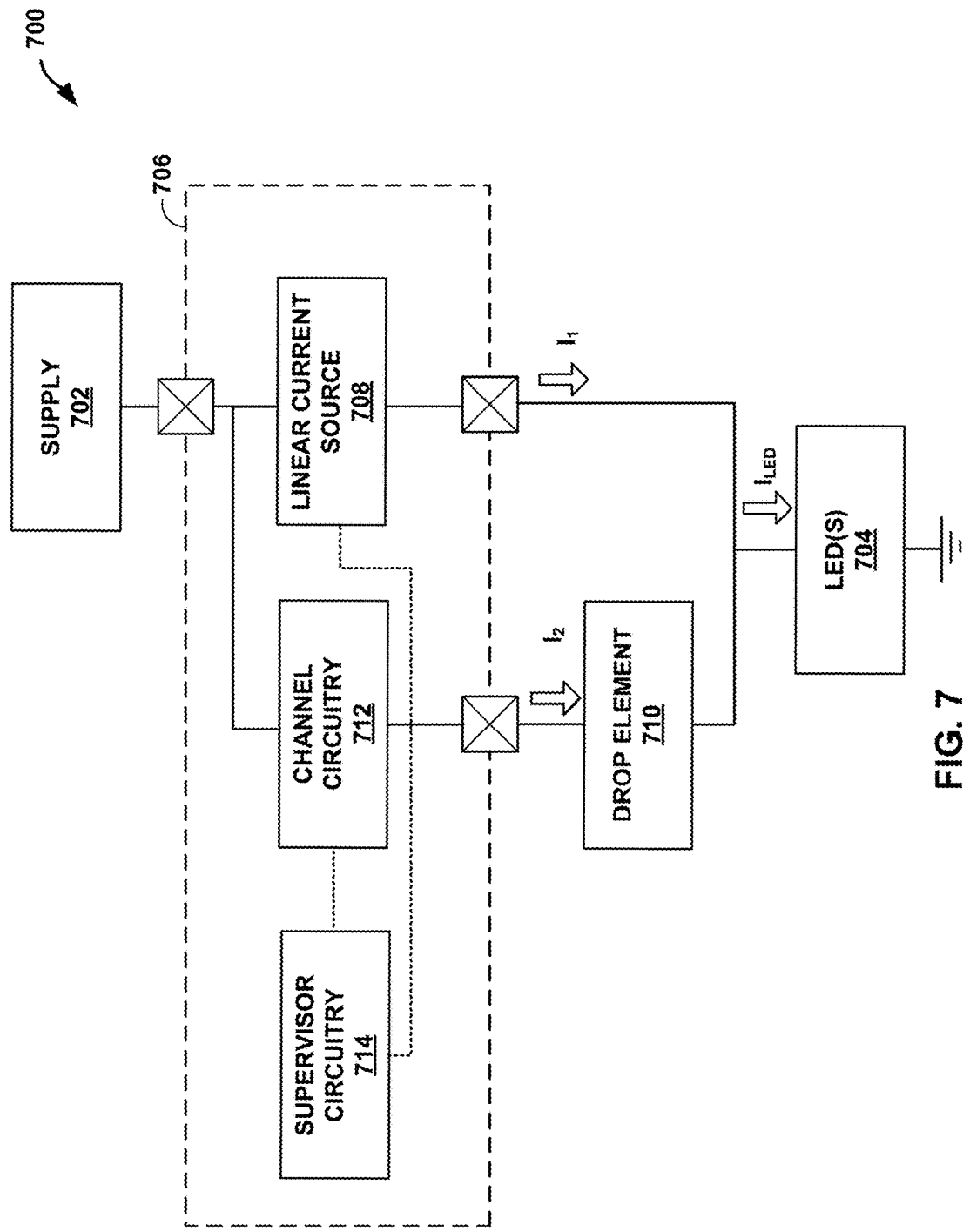
FIG. 7 is a block diagram illustrating a second example of the system of FIG. 1, in accordance with one or more techniques of this disclosure.

FIG. 7 is a block diagram illustrating a second example of the system of FIG. 1, in accordance with one or more techniques of this disclosure. As illustrated in the example of FIG. 7, system 700 may include supply 702, LEDs 704, linear current source 708, drop element 710, channel circuitry 712, and supervisor circuitry 714, which may be examples of supply 102, LEDs 104, linear current source 108, drop element 110, channel circuitry 112, and supervisor circuitry 114 of FIG. 1.

In the example of FIG. 7, IC 706 is arranged on a high side of supply 702. More specifically, the first series path includes a positive terminal of supply 702 directly coupled to a first node of linear current source 708, a second node of linear current source 708 directly coupled to a first node of LEDs 704, and a second node of LEDs 704 directly coupled to a negative terminal of supply 702. In this example, the second series path includes the positive terminal of supply 702 directly coupled to a first node of channel circuitry 712, a second node of channel circuitry 712 directly coupled to a first node of drop element 710, a second node of drop element 710 directly coupled to a first node of LEDs 704, and the second node of LEDs 704 directly coupled to a negative terminal of the supply.

Figure 8:
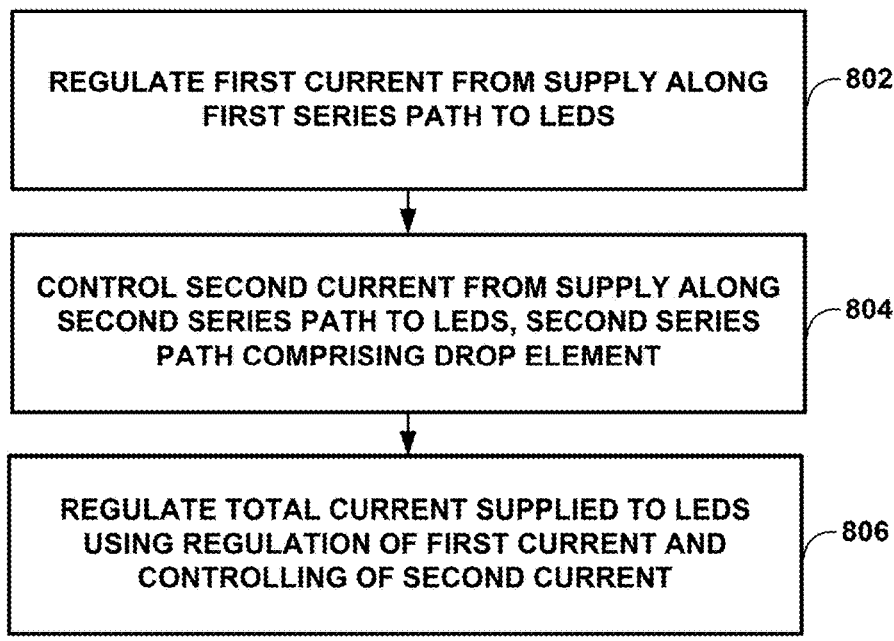
FIG. 8 is a flow diagram consistent with techniques for reducing an amount of power dissipated at a linear current source, in accordance with this disclosure.

FIG. 8 is a flow diagram consistent with techniques for reducing an amount of power dissipated at a linear current source, in accordance with this disclosure. For purposes of illustration only, the example operations are described below within the context of FIG. 1, FIGS. 2A and 2B, FIGS. 3A and 3B, FIG. 4, FIG. 5, FIG. 6, and FIG. 7. However, the techniques described below can be used in any permutation, and in any combination, with supply 102, LEDs 104, linear current source 108, drop element 110, channel circuitry 112, and supervisor circuitry 114 of FIG. 1.

In accordance with one or more techniques of this disclosure, linear current source 108 regulates a first current from supply 102 along first series path 120 to LEDs 104 (802). Channel circuitry 112 controls a second current from supply 102 along second series path 122 to LEDs 104, second series path 122 comprising drop element 110 (804). Supervisor circuitry 114, with linear current source 108 and channel circuitry 112, regulates a total current supplied to LEDs 104 using the regulation of first current and the controlling of the second current (806).

Figure 9:
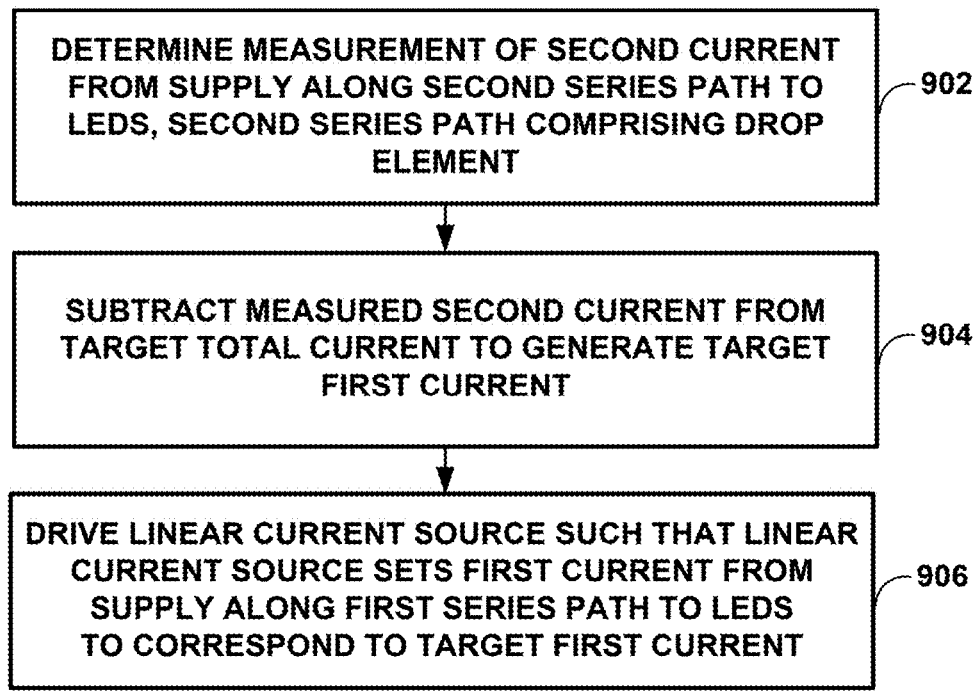
FIG. 9 is a flow diagram consistent with techniques for driving a linear current source to reduce an amount of power dissipated at a linear current source, in accordance with this disclosure.

FIG. 9 is a flow diagram consistent with techniques for driving a linear current source to reduce an amount of power dissipated at a linear current source, in accordance with this disclosure. For purposes of illustration only, the example operations are described below within the context of FIG. 1, FIGS. 2A and 2B, FIGS. 3A and 3B, FIG. 4, FIG. 5, FIG. 6, and FIG. 7. However, the techniques described below can be used in any permutation, and in any combination, with supply 102, LEDs 104, linear current source 108, drop element 110, channel circuitry 112, and supervisor circuitry 114 of FIG. 1.

In accordance with one or more techniques of this disclosure, current sensor 232A determines a measurement of second current from supply 202 along a second series path to LEDs 204, the second series path including drop element 210 (902). Current set module 242 subtracts the measured second current from a target total current to generate a target first current (904). Current set module 242 drives linear current source 208 such that linear current source 208 sets the first current from supply 202 along the first series path to LEDs 204 to correspond to the target first current (906). For example, current set module 242 outputs a control signal to set current set module 222 to drive power element 220 such that linear current source 208 sets the first current from supply 202 along the first series path to LEDs 204 to correspond to the target first current.

Figure 10:
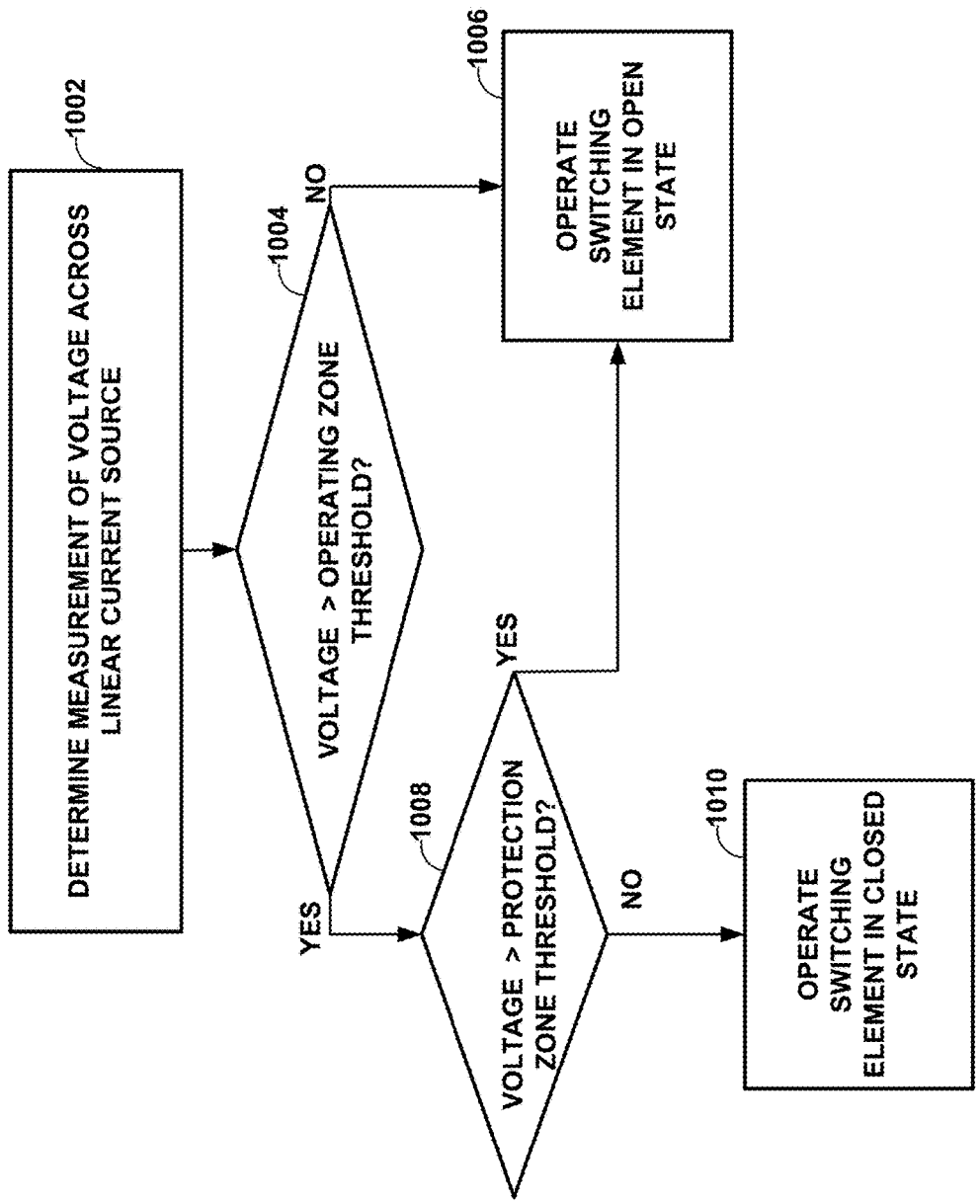
FIG. 10 is a flow diagram consistent with techniques for controlling channel circuitry with a switching element, in accordance with this disclosure.

FIG. 10 is a flow diagram consistent with techniques for controlling channel circuitry with a switching element, in accordance with this disclosure. For purposes of illustration only, the example operations are described below within the context of FIG. 1, FIGS. 2A and 2B, FIGS. 3A and 3B, FIG. 4, FIG. 5, FIG. 6, and FIG. 7. However, the techniques described below can be used in any permutation, and in any combination, with supply 102, LEDs 104, linear current source 108, drop element 110, channel circuitry 112, and supervisor circuitry 114 of FIG. 1.

In accordance with one or more techniques of this disclosure, supervisor circuitry 214 determines a measurement of voltage across linear current source 208 (1002). Supervisor circuitry 214 determines whether the voltage across linear current source 208 is greater than an operating zone threshold (1004). In response to determining the voltage across linear current source 208 is greater than an operating zone threshold ("YES" of step 1004), supervisor circuitry 214 determines whether the voltage across linear current source 208 is greater than a protection zone threshold (1008). In response to determining the voltage across linear current source 208 is not greater than the protection zone threshold ("NO" of step 1008), supervisor circuitry 214 operates switching element 230A in a closed state (1010). In response, however, to determining the voltage across linear current source 208 is greater than the protection zone threshold ("YES" of step 1008), supervisor circuitry 214 operates switching element 230A in an open state (1006).

In response, however, to determining the voltage across linear current source 208 is not greater than an operating zone threshold ("NO" of step 1004), supervisor circuitry 214 supervisor circuitry 214 operates switching element 230A in an open state (1006).

Figure 11:
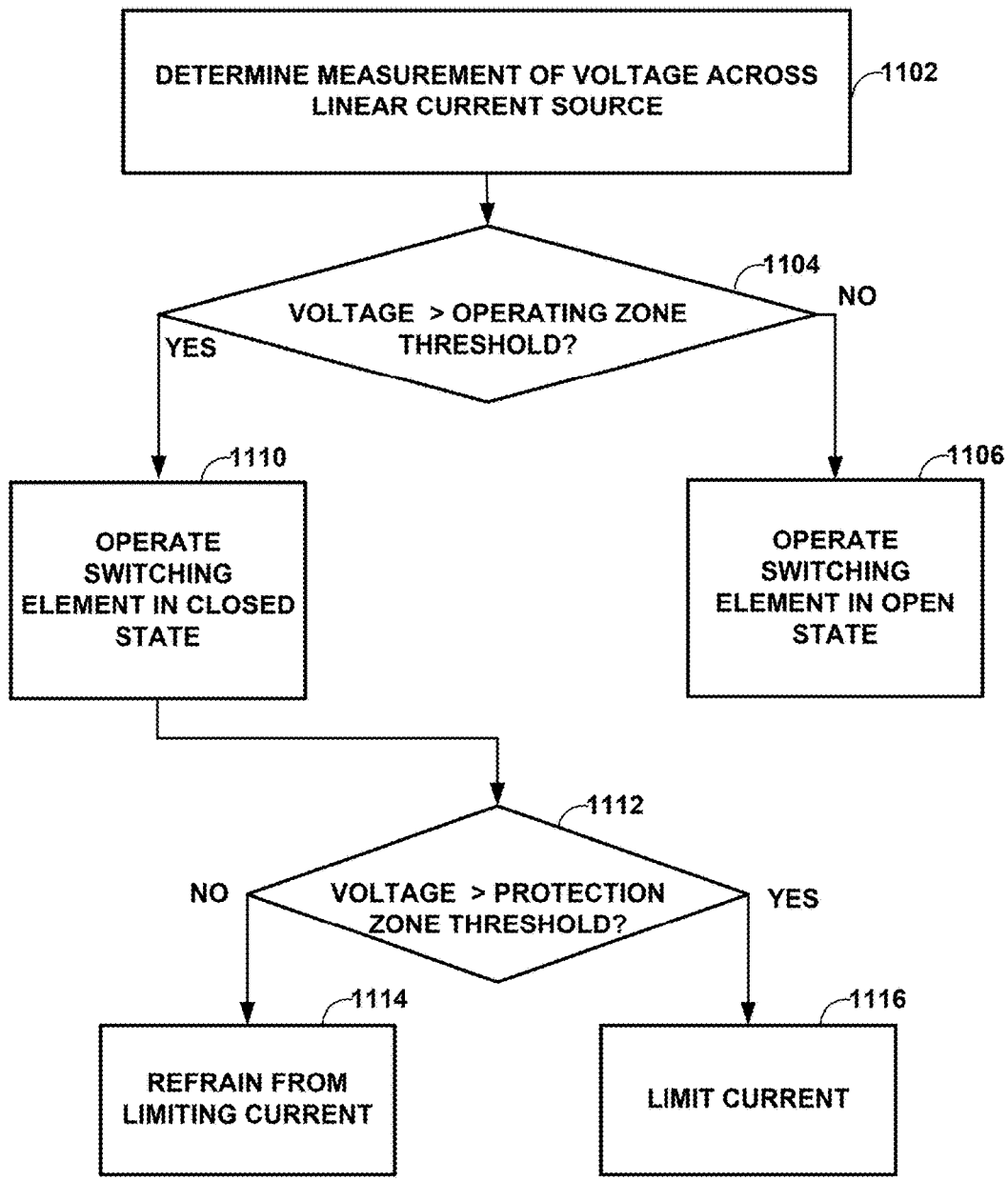
FIG. 11 is a flow diagram consistent with techniques for controlling channel circuitry with a protected switching element, in accordance with this disclosure.

FIG. 11 is a flow diagram consistent with techniques for controlling channel circuitry with a with a protected switching element, in accordance with this disclosure. For purposes of illustration only, the example operations are described below within the context of FIG. 1, FIGS. 2A and 2B, FIGS. 3A and 3B, FIG. 4, FIG. 5, FIG. 6, and FIG. 7. However, the techniques described below can be used in any permutation, and in any combination, with supply 102, LEDs 104, linear current source 108, drop element 110, channel circuitry 112, and supervisor circuitry 114 of FIG. 1.

In accordance with one or more techniques of this disclosure, supervisor circuitry 214 determines a measurement of voltage across linear current source 208 (1102). Supervisor circuitry 214 determines whether the voltage across linear current source 208 is greater than an operating zone threshold (1104). In response to determining the voltage across linear current source 208 is not greater than an operating zone threshold ("NO" of step 1104), supervisor circuitry 214 operates protected switching element 230B in an open state (1106).

In response, however, to determining the voltage across linear current source 208 is greater than the operating zone threshold ("YES" of step 1104), supervisor circuitry 214 operates protected switching element 230B in a closed state (1110) and determines whether the voltage across linear current source 208 is greater than a protection zone threshold (1112). In response to determining the voltage across linear current source 208 is greater than the protection zone threshold ("YES" of step 1112), supervisor circuitry 214 limits current (1116). For example, supervisor circuitry 214 sets programmable limitation current module 232B to drive protected switching element 230B to limited current to a target total current. In response, however, to determining the voltage across linear current source 208 is not greater than the protection zone threshold ("NO" of step 1112), supervisor circuitry 214 refrains from limiting current (1114).

Figure 12:
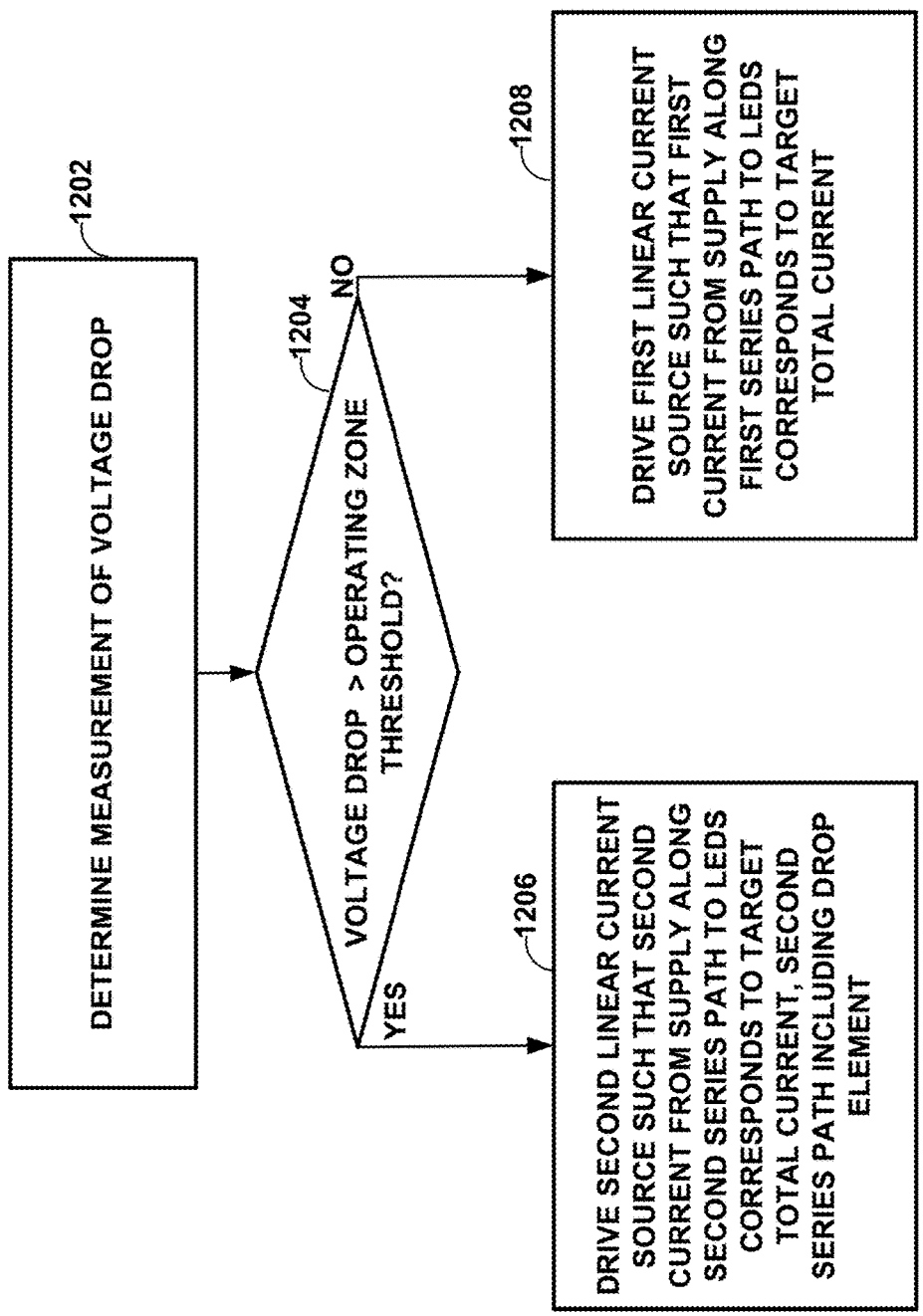
FIG. 12 is a flow diagram consistent with techniques for driving a first linear current source and a second linear current source to reduce an amount of power dissipated at a linear current source, in accordance with this disclosure.

FIG. 12 is a flow diagram consistent with techniques for driving a first linear current source and a second linear current source to reduce an amount of power dissipated at a linear current source, in accordance with this disclosure. For purposes of illustration only, the example operations are described below within the context of FIG. 1, FIGS. 2A and 2B, FIGS. 3A and 3B, FIG. 4, FIG. 5, FIG. 6, and FIG. 7. However, the techniques described below can be used in any permutation, and in any combination, with supply 102, LEDs 104, linear current source 108, drop element 110, channel circuitry 112, and supervisor circuitry 114 of FIG. 1.

In accordance with one or more techniques of this disclosure, supervisor circuitry 214 determines a measurement of voltage across linear current source 208 (1202). Supervisor circuitry 214 determines whether the voltage across linear current source 208 is greater than an operating zone threshold (1204). In response to determining the voltage across linear current source 208 is not greater than an operating zone threshold ("NO" of step 1204), supervisor circuitry 214 drives first linear current source 408 such that a first current along a first series path to LEDs 404 corresponds to a target total current (1208). In response, however, to determining the voltage across linear current source 208 is not greater than an operating zone threshold ("YES" of step 1204), supervisor circuitry 214 drives second linear current source 412 such that a second current along a second series path to LEDs 404 corresponds to the target total current, the second series path including drop element 410 (1206).

The following examples may illustrate one or more aspects of the disclosure.

Example 1

A controller circuit for a set of light emitting diodes (LEDs), the controller circuit comprising: a linear current source configured to regulate a first current from a supply along a first series path to the set of LEDs; channel circuitry configured to control a second current from the supply along a second series path to the set of LEDs, the second series path being in parallel with the first series path and the second series path comprising a drop element coupled in series with the supply and the set of LEDs; and supervisor circuitry configured to regulate a total current supplied to the set of LEDs using the linear current source and the channel circuitry, the total current comprising the first current and the second current.

Example 2

The controller circuit of example 1, wherein the channel circuitry comprises a current sensor configured to measure the second current; and wherein, to regulate the total current, the supervisor circuitry is configured to drive the linear current source using the measured second current.

Example 3

The controller circuit of any combination of examples 1-2, wherein the channel circuitry comprises a switching element coupled in series with the supply, the drop element, and the set of LEDs along the second series path and configured to operate in an open state or a closed state, wherein during the open state the switching element sets the second current to correspond to zero and wherein during the closed state the switching element refrains from setting the second current to correspond to zero, and wherein, to control the second current, the channel circuitry is configured to operate the switching element in the open state or the closed state.

Example 4

The controller circuit of any combination of examples 1-3, wherein, to regulate the total current, the supervisor circuitry is configured to operate the switching element in the closed state in response to a voltage across the linear current source being greater than an operating zone threshold and to operate the switching element in the open state in response to the voltage across the linear current source being not greater than the operating zone threshold.

Example 5

The controller circuit of any combination of examples 1-4, wherein the channel circuitry is configured to limit current through the switching element to be not greater than a target total current; and wherein, to regulate the total current, the supervisor circuitry is configured to drive the linear current source such that the first current corresponds to zero in response to the voltage across the linear current source being greater than a protection zone threshold.

Example 6

The controller circuit of any combination of examples 1-5, wherein, to regulate the total current, the supervisor circuitry is configured to operate the switching element in the closed state further in response to the voltage across the linear current source being not greater than a protection zone threshold and to operate the switching element in the open state in response to the voltage across the linear current source being greater than the protection zone threshold.

Example 7

The controller circuit of any combination of examples 1-6, wherein, to drive the linear current source, the supervisor circuitry is configured to: subtract the measured second current from a target total current to generate a target first current; and drive the linear current source such that the linear current source sets the first current to correspond to the target first current.

Example 8

The controller circuit of any combination of examples 1-7, wherein the linear current source is a first linear current source and wherein the channel circuitry comprises: a second linear current source configured to regulate the second current, wherein, to regulate the total current, the supervisor circuitry is configured to operate in a plurality of states comprising a first state and a second state, wherein when operating in the first state the supervisor circuit is configured to drive the first linear current source such that the first current corresponds to a target total current and drive the second linear current source such that the second current corresponds to zero, and wherein when operating in the second state the supervisor circuit is configured to drive the second linear current source such that the second current corresponds to the target total current and drive the first linear current source such that the first current corresponds to zero.

Example 9

The controller circuit of any combination of examples 1-8, wherein, to regulate the total current, the supervisor circuitry is configured to: determine a voltage drop using one or more of a voltage across the first linear current source and a voltage across the second linear current source; in response to the voltage drop being not greater than an operating zone threshold, operate in the first state; and in response to the voltage drop being greater than the operating zone threshold, operate in the second state.

Example 10

The controller circuit of any combination of examples 1-9, wherein the drop element comprises a resistor, a diode, or a switching element.

Example 11

The controller circuit of any combination of examples 1-10, wherein the first series path comprises a positive terminal of the supply directly coupled to a first node of the set of LEDs, a second node of the set of LEDs directly coupled to a first node of the linear current source, and a second node of the linear current source directly coupled to a negative terminal of the supply; and wherein the second series path comprises the positive terminal of the supply directly coupled to the first node of the set of LEDs, the second node of the set of LEDs directly coupled to a first node of the drop element, a second node of the drop element directly coupled to a first node of the channel circuitry, and a second node of the channel circuitry directly coupled to the negative terminal of the supply.

Example 12

The controller circuit of any combination of examples 1-11, wherein the first series path comprises a positive terminal of the supply directly coupled to a first node of the linear current source, a second node of the linear current source directly coupled to a first node of the set of LEDs, and a second node of the set of LEDs directly coupled to a negative terminal of the supply; and wherein the second series path comprises the positive terminal of the supply directly coupled to a first node of the channel circuitry, a second node of the channel circuitry directly coupled to a first node of the drop element, a second node of the drop element directly coupled to a first node of the set of LEDs, and the second node of the set of LEDs directly coupled to a negative terminal of the supply.

Example 13

The controller circuit of any combination of examples 1-12, wherein the channel circuitry is a first channel circuitry, wherein the drop element is a first drop element, and wherein the controller circuit further comprises: second channel circuitry configured to control a third current from the supply along a third series path to the set of LEDs, the third series path being in parallel with the first series path and the second series path, and wherein the third series path comprises a second drop element coupled in series with the supply and the set of LEDs, wherein the total current further comprises the third current and wherein, to regulate the total current, the supervisor circuitry is configured to control the total current further using the second channel circuitry.

Example 14

A method for controlling a set of light emitting diodes (LEDs), the method comprising: regulating, by a controller circuit, a first current from a supply along a first series path to the set of LEDs; controlling, by the controller circuit, a second current from the supply along a second series path to the set of LEDs, the second series path being in parallel with the first series path and the second series path comprising a drop element coupled in series with the supply and the set of LEDs; and regulating, by the controller circuit, a total current supplied to the set of LEDs using the regulation of the first current and the controlling of the second current, the total current comprising the first current and the second current.

Example 15

The method of example 14, further comprising: determining, by the controller circuit, a measurement of the second current, wherein regulating the total current comprises driving a linear current source to regulate the first current using the measured second current.

Example 16

The method of any combination of examples 14-15, wherein the controller circuit comprises a switching element coupled in series with the supply, the drop element, and the set of LEDs along the second series path and configured to operate in an open state or a closed state, wherein during the open state the switching element sets the second current to correspond to zero and wherein during the closed state the switching element refrains from setting the second current to correspond to zero; and wherein controlling the second current comprises operating the switching element in the open state or the closed state.

Example 17

The method of any combination of examples 14-16, wherein regulating the total current comprises: operating the switching element in the closed state in response to a voltage across the linear current source being greater than an operating zone threshold; and operating the switching element in the open state in response to the voltage across the linear current source being not greater than the operating zone threshold.

Example 18

The method of any combination of examples 14-17, wherein the operating zone threshold corresponds to a resistance of the drop element multiplied by the total current.

Example 19

The method of any combination of examples 14-18, wherein regulating the total current comprises: operating the switching element in the closed state further in response to the voltage across the linear current source being not greater than a protection zone threshold; and operating the switching element in the open state in response to the voltage across the linear current source being greater than the protection zone threshold.

Example 20

A system comprising: a supply; a drop element; a set of light emitting diodes (LEDs); and a controller circuit for the set of LEDs comprising: a linear current source configured to regulate a first current from the supply along a first series path to the set of LEDs; channel circuitry configured to control a second current from the supply along a second series path to the set of LEDs, the second series path being in parallel with the first series path and the second series path comprising the drop element coupled in series with the supply and the set of LEDs; and supervisor circuitry configured to regulate a total current supplied to the set of LEDs using the linear current source and the channel circuitry, the total current comprising the first current and the second current.

Various aspects have been described in this disclosure. These and other aspects are within the scope of the following claims.

The invention claimed is:

1. A controller circuit for a set of light emitting diodes (LEDs), the controller circuit comprising:
a linear current source configured to regulate a first current from a supply along a first series path to the set of LEDs;
channel circuitry configured to control a second current from the supply along a second series path to the set of LEDs, the second series path being in parallel with the first series path and the second series path comprising a drop element coupled in series with the supply and the set of LEDs, wherein the channel circuitry comprises a current sensor configured to measure the second current, wherein the channel circuitry comprises a switching element coupled in series with the supply, the drop element, and the set of LEDs along the second series path, wherein the switching element is configured to operate in an open state or a closed state, wherein during the open state the switching element sets the second current to correspond to zero, wherein during the closed state the switching element refrains from setting the second current to correspond to zero, and wherein, to control the second current, the channel circuitry is configured to operate the switching element in the open state or the closed state; and
supervisor circuitry configured to regulate a total current supplied to the set of LEDs using the linear current source and the channel circuitry, the total current comprising the first current and the second current, wherein, to regulate the total current, the supervisor circuitry is configured to drive the linear current source using the measured second current and to operate the switching element in the closed state in response to a voltage across the linear current source being greater than an operating zone threshold and to operate the switching element in the open state in response to the voltage across the linear current source being not greater than the operating zone threshold.

2. The controller circuit of claim 1,
wherein the channel circuitry is configured to limit current through the switching element to be not greater than a target total current; and
wherein, to regulate the total current, the supervisor circuitry is configured to drive the linear current source such that the first current corresponds to zero in response to the voltage across the linear current source being greater than a protection zone threshold.

3. The controller circuit of claim 1, wherein, to regulate the total current, the supervisor circuitry is configured to operate the switching element in the closed state further in response to the voltage across the linear current source being not greater than a protection zone threshold and to operate the switching element in the open state in response to the voltage across the linear current source being greater than the protection zone threshold.

4. The controller circuit of claim 1, wherein, to drive the linear current source, the supervisor circuitry is configured to:
subtract the measured second current from a target total current to generate a target first current; and
drive the linear current source such that the linear current source sets the first current to correspond to the target first current.

5. A controller circuit for a set of light emitting diodes (LEDs), the controller circuit comprising:

a first linear current source configured to regulate a first current from a supply along a first series path to the set of LEDs;

channel circuitry configured to control a second current from the supply along a second series path to the set of LEDs, the second series path being in parallel with the first series path and the second series path comprising a drop element coupled in series with the supply and the set of LEDs, wherein the channel circuitry comprises a second linear current source configured to regulate the second current; and supervisor circuitry configured to regulate a total current supplied to the set of LEDs using the linear current source and the channel circuitry, the total current comprising the first current and the second current, wherein, to regulate the total current, the supervisor circuitry is configured to:

determine a voltage drop using one or more of a voltage across the first linear current source and a voltage across the second linear current source;

in response to the voltage drop being not greater than an operating zone threshold, operate in a first state, wherein when operating in the first state the supervisor circuit is configured to drive the first linear current source such that the first current corresponds to a target total current and drive the second linear current source such that the second current corresponds to zero; and in response to the voltage drop being greater than the operating zone threshold, operate in a second state, wherein when operating in the second state the supervisor circuit is configured to drive the second linear current source such that the second current corresponds to the target total current and drive the first linear current source such that the first current corresponds to zero.

6. The controller circuit of claim 1, wherein the drop element comprises a resistor, a diode, or a switching element.

7. The controller circuit of claim 1,
wherein the first series path comprises a positive terminal of the supply directly coupled to a first node of the set of LEDs, a second node of the set of LEDs directly coupled to a first node of the linear current source, and a second node of the linear current source directly coupled to a negative terminal of the supply; and
wherein the second series path comprises the positive terminal of the supply directly coupled to the first node of the set of LEDs, the second node of the set of LEDs directly coupled to a first node of the drop element, a second node of the drop element directly coupled to a first node of the channel circuitry, and a second node of the channel circuitry directly coupled to the negative terminal of the supply.

8. The controller circuit of claim 1,
wherein the first series path comprises a positive terminal of the supply directly coupled to a first node of the linear current source, a second node of the linear current source directly coupled to a first node of the set of LEDs, and a second node of the set of LEDs directly coupled to a negative terminal of the supply; and
wherein the second series path comprises the positive terminal of the supply directly coupled to a first node of the channel circuitry, a second node of the channel circuitry directly coupled to a first node of the drop element, a second node of the drop element directly coupled to a first node of the set of LEDs, and the second node of the set of LEDs directly coupled to a negative terminal of the supply.

9. The controller circuit of claim 1, wherein the channel circuitry is a first channel circuitry, wherein the drop element is a first drop element, and wherein the controller circuit further comprises:

second channel circuitry configured to control a third current from the supply along a third series path to the set of LEDs, the third series path being in parallel with the first series path and the second series path, and wherein the third series path comprises a second drop element coupled in series with the supply and the set of LEDs, wherein the total current further comprises the third current and wherein, to regulate the total current, the supervisor circuitry is configured to control the total current further using the second channel circuitry.

10. A method for controlling a set of light emitting diodes (LEDs), the method comprising:

regulating, by a controller circuit, a first current from a supply along a first series path to the set of LEDs;

controlling, by the controller circuit, a second current from the supply along a second series path to the set of LEDs, the second series path being in parallel with the first series path and the second series path comprising a drop element coupled in series with the supply and the set of LEDs, wherein the controller circuit comprises a switching element coupled in series with the supply, the drop element, and the set of LEDs along the second series path and configured to operate in an open state or a closed state, wherein during the open state the switching element sets the second current to correspond to zero and wherein during the closed state the switching element refrains from setting the second current to correspond to zero and wherein controlling the second current comprises operating the switching element in the open state or the closed state;

determining, by the controller circuit, a measurement of the second current; and regulating, by the controller circuit, a total current supplied to the set of LEDs using the regulation of the first current and the controlling of the second current, the total current comprising the first current and the second current, wherein regulating the total current comprises:

driving a linear current source to regulate the first current using the measured second current and operating the switching element in the closed state in response to a voltage across the linear current source being greater than an operating zone threshold and operating the switching element in the open state in response to the voltage across the linear current source being not greater than the operating zone threshold.

11. The method of claim 10, wherein the operating zone threshold corresponds to a resistance of the drop element multiplied by the total current.

12. The method of claim 10, wherein regulating the total current comprises:

operating the switching element in the closed state further in response to the voltage across the linear current source being not greater than a protection zone threshold; and operating the switching element in the open state in response to the voltage across the linear current source being greater than the protection zone threshold.

* * * * *